(12) United States Patent
Moffi et al.

(10) Patent No.: US 7,020,499 B2
(45) Date of Patent: Mar. 28, 2006

(54) HANDS FREE VEHICLE MOUNTED MOBILE TELEPHONE WITH AUDIO

(75) Inventors: Diane C. Moffi, Norcross, GA (US); Vernon Meadows, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 588 days.

(21) Appl. No.: 10/013,092

(22) Filed: Dec. 7, 2001

(65) Prior Publication Data

US 2003/0109290 A1  Jun. 12, 2003

(51) Int. Cl.
*H04M 1/00*  (2006.01)

(52) U.S. Cl. .............................. 455/569.1; 455/569.2; 455/41.2; 455/575.9

(58) Field of Classification Search .............. 455/556.1, 455/561, 563–565, 567, 569.1, 569.2, 575.9, 455/344, 345, 352, 41.2; 379/88.01, 354, 379/355.02, 88.02, 88.03
See application file for complete search history.

(56) References Cited

U.S. PATENT DOCUMENTS

| | | | | |
|---|---|---|---|---|
| 4,737,976 | A * | 4/1988 | Borth et al. ................ | 455/563 |
| 5,450,525 | A | 9/1995 | Russell et al. | |
| 5,509,048 | A * | 4/1996 | Meidan et al. .............. | 455/564 |
| 5,535,258 | A * | 7/1996 | Joglekar et al. ............ | 455/563 |
| 5,561,712 | A * | 10/1996 | Nishihara ................ | 455/569.1 |
| 5,878,340 | A * | 3/1999 | Asaoka et al. ............ | 455/432.1 |
| 6,005,927 | A * | 12/1999 | Rahrer et al. .............. | 455/415 |
| 6,167,255 | A * | 12/2000 | Kennedy et al. ......... | 455/414.1 |
| 6,252,495 | B1 * | 6/2001 | Nakamura .................. | 340/328 |
| 6,304,764 | B1 | 10/2001 | Pan | |
| 6,320,957 | B1 * | 11/2001 | Draganoff ................... | 379/354 |
| 6,339,700 | B1 * | 1/2002 | Tsai ........................... | 455/566 |
| 6,339,706 | B1 | 1/2002 | Tillgren et al. | |
| 6,341,218 | B1 * | 1/2002 | Poplawsky et al. ...... | 455/569.1 |
| 6,349,212 | B1 * | 2/2002 | Martensson et al. ........ | 455/462 |
| 6,349,222 | B1 | 2/2002 | Hafiz | |
| 6,459,361 | B1 * | 10/2002 | Kajimura .................... | 340/7.56 |
| 6,539,238 | B1 * | 3/2003 | Brouns et al. ............ | 455/414.1 |
| 6,567,676 | B1 * | 5/2003 | Tsai ........................ | 455/569.2 |
| 6,745,054 | B1 * | 6/2004 | Fraccaroli ................ | 455/569.1 |
| 6,792,295 | B1 * | 9/2004 | Hanevich et al. ......... | 455/569.1 |
| 2002/0068605 | A1 * | 6/2002 | Winfield ..................... | 455/556 |
| 2002/0078013 | A1 * | 6/2002 | Josenhans ....................... | 707/1 |
| 2002/0165011 | A1 * | 11/2002 | Shi et al. .................... | 455/564 |

(Continued)

OTHER PUBLICATIONS

"Mobile Phone Car Kits products" at www.rddirect.co.uk/mall/RDDirect.

(Continued)

*Primary Examiner*—Joseph Feild
*Assistant Examiner*—KAmran Afshar
(74) *Attorney, Agent, or Firm*—Merchant & Gould (57) ABSTRACT

A hands-free vehicle mounted mobile telephone system with audio that enables the user of the phone to dial and operate the phone without taking the user's hands off of the steering wheel of a car or other motor-operated vehicle. The user may select the party to be called using an audio selector and, when the party to be called has been selected, the user may then have the number automatically dialed using voice activation or by pressing a button. The controls for the system are designed to be placed on or near the steering wheel/column of the motor-operated vehicle such that the user of the phone may manipulate the controls using the user's fingers without the need to remove either hand from the steering wheel. The device may be used with any type of mobile telephone.

27 Claims, 4 Drawing Sheets

U.S. PATENT DOCUMENTS

2003/0032415 A1* 2/2003 Cho et al. .................. 455/567
2004/0204119 A1* 10/2004 Ho et al. .................... 455/564

OTHER PUBLICATIONS

"Handsfree cellular products for your mobile phone" at www/cellulardeals.com/HandsFreeAccessories.cfm.

"Sound synthesis by physical modelling" at www.audionica.com/Audionicaen/synthes.htm.

"Sound Reproduction Technology" at www.atcsd.com/HTML/sound1.html.

* cited by examiner

Fig_1

Fig_3

Fig_4

Fig. 5

HANDS FREE VEHICLE MOUNTED MOBILE TELEPHONE WITH AUDIO

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

TECHNICAL FIELD

The present invention relates to mobile communications. More particularly, the present invention relates to a mobile communications system that provides hands-free dialing capabilities with audio, thereby enabling a mobile telephone to be used during operation of a motor-vehicle, such as a car, wherein the user of the telephone does not need to remove the user's hands from the steering wheel and/or divert the user's vision while operating the vehicle.

BACKGROUND OF THE INVENTION

Over the past few years, the use of mobile communications devices has greatly increased. More and more individuals own and use mobile communications devices, such as mobile telephones, as part of their daily routine, to keep in contact with others throughout the day. These devices have greatly increased the ability for individuals to move from location to location while still being able to conduct business or tend to personal matters.

However, the use of mobile telephones while moving from location to location has also greatly increased the use of these devices while driving. Instead of using the mobile telephone only in emergency situations, many individuals use their telephones while driving a motor vehicle, such as a car or truck. To do so, these drivers will sometimes take their eyes off of the road or waterway to look at their telephone to dial the desired number. Additionally, while dialing and/or talking, the driver will sometimes take one hand from the wheel of the vehicle to push the buttons and/or hold the mobile telephone while talking to the other party. As such, the driver is less likely to be able to react quickly to an emergency situation while driving and is a much greater risk to the surrounding drivers since their attention is diverted from the road while dialing and/or talking on the telephone.

As a result, many states and countries are beginning to enact legislation restricting and even prohibiting the use of mobile telephones while operating a motor vehicle. These laws are designed to ensure that a driver's attention is not distracted while dialing/operating a mobile telephone and to ensure that drivers keep their hands on the wheel of the vehicle to enable the driver to react more quickly in emergency situations.

Various systems have attempted to reduce the need for a driver to remove the driver's hand to use a mobile telephone and/or to reduce the amount of time a driver's eyes are not on the road ahead. These conventional systems are also in response to the aforementioned legislation.

One alternative is the use of an earphone when talking on the mobile telephone such that the driver may freely talk without holding the mobile telephone. However, the driver must still remove the driver's vision from the road and at least one hand from the wheel when dialing the telephone. Additionally, many states have legislation prohibiting the use of earphones while driving as they severely limit a driver's ability to hear, which is necessary especially to hear the approach of emergency vehicles.

Another alternative that removes some of the problems associated with an earphone is the use of a cradle for holding the telephone, with all vocal communication occurring through a speakerphone. While this system does eliminate the earphone, the telephone must still be dialed manually such that the driver's vision is distracted while dialing, and at least one hand must be removed from the wheel of the vehicle to dial the telephone. Some systems include microphones, but dialing must still be done by hand.

Some car manufacturers have attempted to provide solutions by providing a system having an internal mobile telephone. As such, the phone and its components are installed in the vehicle and may only be used while in the vehicle. The system also provides one or two buttons on the steering wheel that permit the driver to dial one or two programmed numbers that have been input into a memory system. The mobile telephone uses a speakerphone to permit the driver to speak without having to hold the telephone. However, these systems do not use an existing mobile telephone, such as the driver's cellular telephone or satellite telephone; these systems are limited in the number of telephone numbers that may be stored; and these systems are expensive and not available to all drivers.

Other car manufacturers have solved some of the problems by providing a mobile telephone system that also uses an internal mobile telephone, but permits an individual to input multiple numbers into a memory system. The mobile telephone system also provides one or two buttons on the steering wheel and is connected to the car's navigation system. A driver presses one button to scroll through the names and/or numbers that are displayed on the car's navigation system screen. Once the desired number is located, another button may be pressed to place the call. However, these systems also do not use an existing mobile telephone, are expensive, and require the driver to look at a screen to determine what number is to be called, thereby diverting the driver's attention from the road.

What is needed, therefore, is a device that enables an operator of a motor vehicle to use the user's mobile telephone without having to remove either hand from the steering wheel of the vehicle and/or without having the user remove the user's eyes from the road or waterway while operating the vehicle.

SUMMARY

In accordance with the present invention, a hands-free vehicle mounted mobile telephone system with audio is provided that enables the user of the telephone to dial and operate the telephone without taking the user's hands off of the steering wheel of the vehicle. The system uses an existing mobile telephone and connects the telephone to a means for holding the telephone. The mobile telephone is capable of receiving inputs from a satellite remote pad which is placed on or near the steering wheel/column of the vehicle such that the user of the mobile telephone may manipulate the controls using the user's fingers without the need to remove either hand from the steering wheel. The inputs may be delivered using an infrared signal or a radio frequency signal or similar means, or the satellite remote may be hard-wired to the cradle. The controls may then be used to have the name and/or number of the entries stored in the telephone directory to be announced audibly by the system such that they may be heard by the mobile telephone user. As such, the user does not need to remove the user's eyes from the road to determine the party to be called. The call may be made by pressing a button on the satellite remote or by voice activation.

Accordingly, the present invention preferably provides one or more of the following objects.

One object of the present invention is to provide a mobile communications system that permits hands-free dialing of a mobile telephone.

Another object of the present invention is to provide a mobile communications system that permits hands-free use of a mobile telephone.

Still another object of the present invention is to provide a mobile communications system that allows the user to select the party to be called without diverting the user's vision from the road or waterway while driving.

Yet another object of the present invention is to provide a mobile communications system that audibly announces the name and/or number of the party to be called.

Still another object of the present invention is to provide a mobile communications system that utilizes an existing mobile telephone.

Yet another object of the present invention is to provide a mobile communications system that may be used with any type of motor vehicle, new or used.

Another object of the present invention is to provide a mobile communications system that may be used to dial any party and is not limited in the number of caller options.

Still another object of the present invention is to provide a mobile communications system that satisfies legislation regarding the use of mobile telephones while driving a motor vehicle.

These and other objects, features and advantages of the present invention will become apparent after a review of the following detailed description of the disclosed embodiments and the appended claims.

DETAILED DESCRIPTION

The present invention provides a mobile telecommunications system comprising a hands-free mounted mobile telephone system that enables the user of the telephone to dial and operate a mobile telephone without taking the user's hands off of the steering wheel of a car or other motor-operated vehicle. The system uses the user's existing telephone and connects the telephone to a cradle or similar device for holding the telephone while also being capable of receiving inputs from a satellite remote pad. The inputs may be delivered using an infrared signal, a radio frequency signal, or similar means, or the satellite remote may be hard-wired to the cradle.

In use, the user selects the party to be called using either a visual or audio selector and, when the party to be called has been selected, the user may then have the number automatically dialed using voice activation or by pressing a button. The controls for the device are designed to be part of the satellite remote pad which is placed on or near the steering wheel/column of the motor-operated vehicle such that the user of the telephone may manipulate the controls using the user's fingers without the need to remove either hand from the steering wheel. The system may be used with any type of mobile telephone.

The mobile communication system of the present invention is intended to include all variations that permit a driver to use their existing mobile telephone while driving without removing the driver's hands from the wheel and the driver's eyes from the road or waterway. However, for purposes of illustration, one embodiment of the present invention is shown in FIG. 1.

Figure 1:
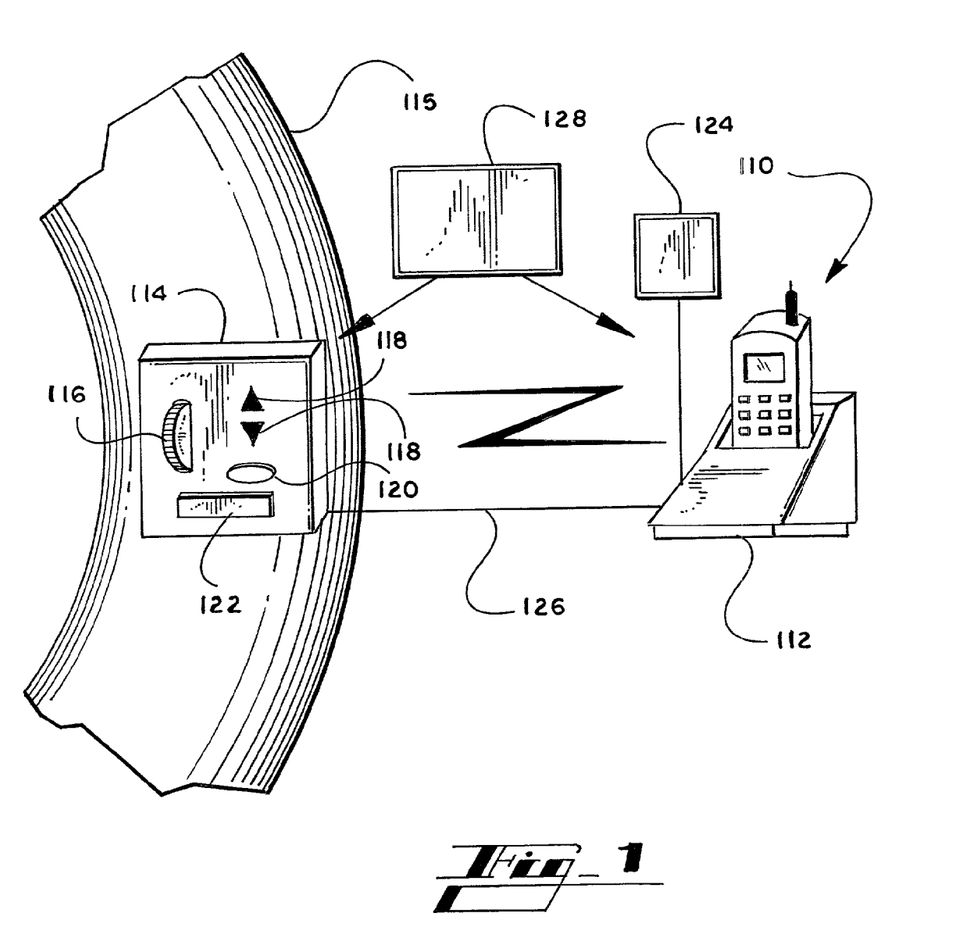
FIG. 1 is schematic of one embodiment of the mobile communications system of the present invention.

As shown in FIG. 1, a mobile telephone 110 is placed in a cradle 112 for holding the telephone while driving. The cradle 112 may be located anywhere in the vehicle, such as in the glove compartment, on the dashboard, in the trunk, or near the floor, as long as the cradle 112 and/or mobile telephone 110 may be accessed by the remainder of the system. Preferably, the cradle 112 is attached to the dash of the automobile.

A satellite remote pad 114 is provided and the satellite remote pad 114 may be placed anywhere within reach of the driver, though preferably on the steering wheel/column 115 of the motor vehicle such that the driver may use the satellite remote pad 114 without removing the driver's hands from the steering wheel. The satellite remote pad 114, which is described in further detail hereinafter, may include means 116 for individually scrolling through the entries of the names and/or telephone numbers of the user's telephone directory; means 118 for scrolling through multiple name and/or telephone number entries; means 120 for placing and disconnecting a telephone call; and means 122 for viewing the selected name and/or telephone number entry, such as a LCD screen or other visual output. As shown in FIG. 1, the means 116 for individually scrolling through the entries of the names and/or telephone numbers of the user's telephone directory include a scroll wheel. The means 118 for scrolling through multiple name and/or telephone number entries include two triangular-shaped buttons. And the means 120 for placing and disconnecting a telephone call include a single button.

The telephone directory entries may be taken directly from the user's mobile telephone 110, or may be input into an external memory system 124. The entries may be in the form of names of parties to be called, listed either alphabetically or as ordered in the telephone directory, or numbers of parties to be called, listed either numerically or as ordered in the telephone directory. As the driver is scrolling through the name and/or number entries of the telephone directory, an audio component of the present invention audibly announces the name or number. As the user scrolls through the user's directory, and when the entry of the desired party to be called has been audibly announced, the user may then place the call by pressing the means 120 for placing and disconnecting a telephone call, such as a button, on the satellite remote pad 114 or by voice activation. These means may also be used to answer an incoming telephone call and/or to activate a call-waiting feature.

The system may also include the hardware and/or software used to convert the user's telephone directory data into an audio signal that is then heard by the user. The hardware used to carry out the invention may either be included in the satellite remote pad 114, in the cradle 112, or may be a separate part of the system 128. As set forth in greater detail below, the software portions of the system are constructed and arranged to receive a signal from the satellite remote and convert this signal into an audio signal which is then sent to the hardware to be used to electronically announce the selected information. Any software and/or hardware elements capable of creating these signals and electronic sounds may be used in the present invention. Examples include, but are not limited to, FM, AM, Additive, Subtractive, wavetable, physical modeling and HyperSonic Sound System™, a method of sound reproduction from American Technology Corporation.

The satellite remote pad 114 sends signals to the cradle 112 and mobile telephone 110 using a means for sending a signal from the satellite remote to the mobile telephone. These means may be either a wireless signal, such as an infrared signal or radio frequency signal, or it may be a direct hard-wire connection 126. In preferred embodiments, a wireless signal is used.

As set forth, the mobile communication system of the present invention includes a satellite remote that is desirably placed on or near the steering wheel/column of the motor vehicle such that the driver may access the remote without removing the driver's hands from the steering wheel. Alternatively, the control may be placed on or near the floor and may be activated by the user's foot or feet. The scrolling means and means for placing and disconnecting a telephone call would be designed accordingly, as well as means to answer a call and/or to activate a call-waiting feature.

Figure 2:
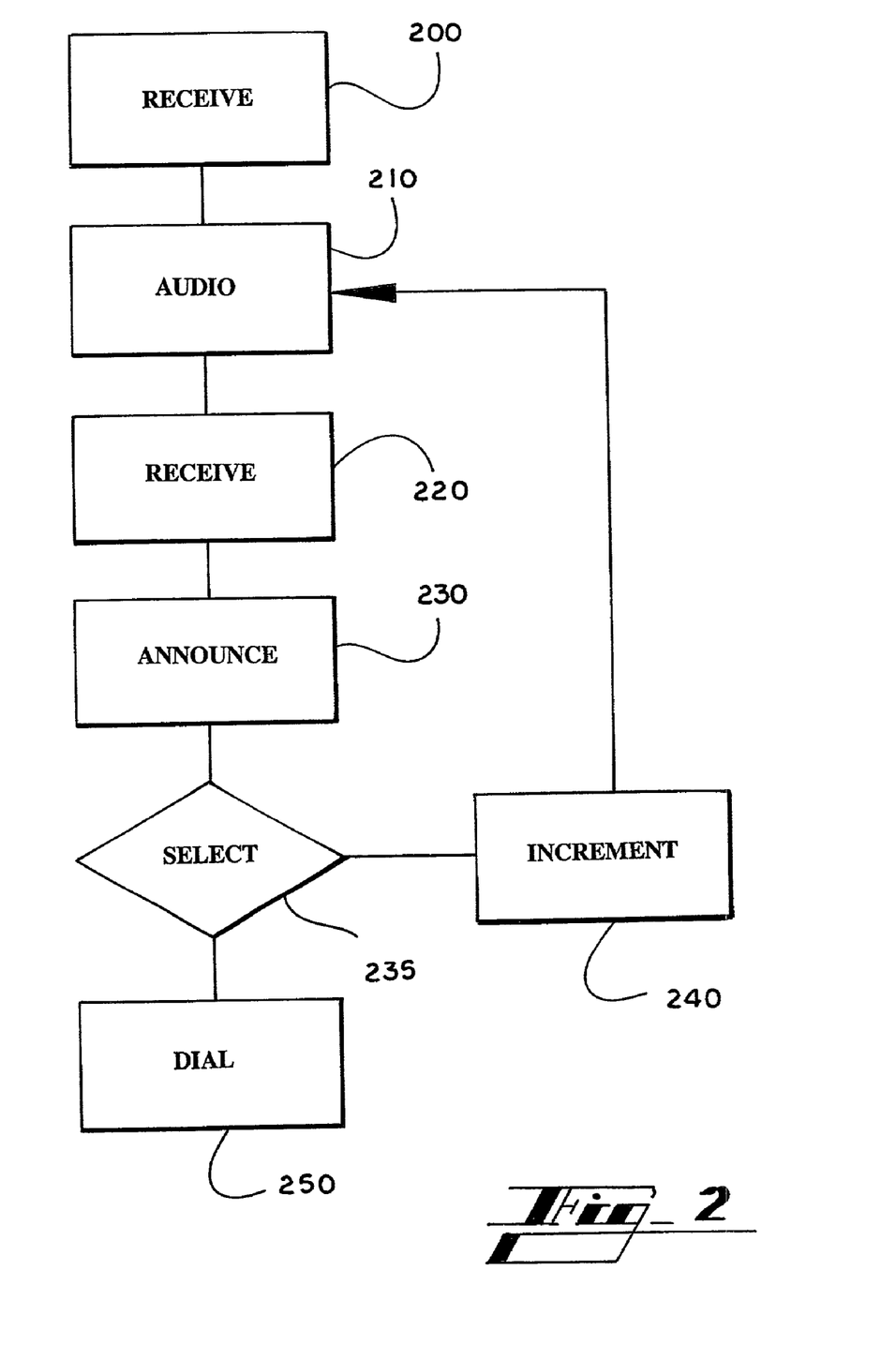
FIG. 2 is a is a flow chart for making a hands-free telephone call according to one embodiment of the present invention.

As shown in FIG. 2, using the system embodiment described in FIG. 1, the user begins by either operating the means 116 for individually scrolling through the entries of the names and/or telephone numbers and/or the means 118 for scrolling through multiple name and/or telephone number entries. A signal is received by the system 200 from the satellite remote pad 114 regarding the name or number currently selected. This signal is then sent to an audio generating software element 210 that sends an audio signal which is received by the means for audibly announcing a party to be called 220, such as an electronic voice generator. This electronic voice generator electronically announces the name and/or telephone number 230. The user then decides 235 whether this is the desired party to be called. If this is not the name and/or number of the desired party to be called, the user can chose another name or number by using either the individual scroll means 116 or the incremental buttons 118 to select another name and/or number 240 which is then signaled to the audio generating software element 210. If the user decides that the desired name and/or number has been selected, the user may then chose to have the person called 250 by pressing the means 120 for placing and disconnecting a telephone call.

Figure 3:
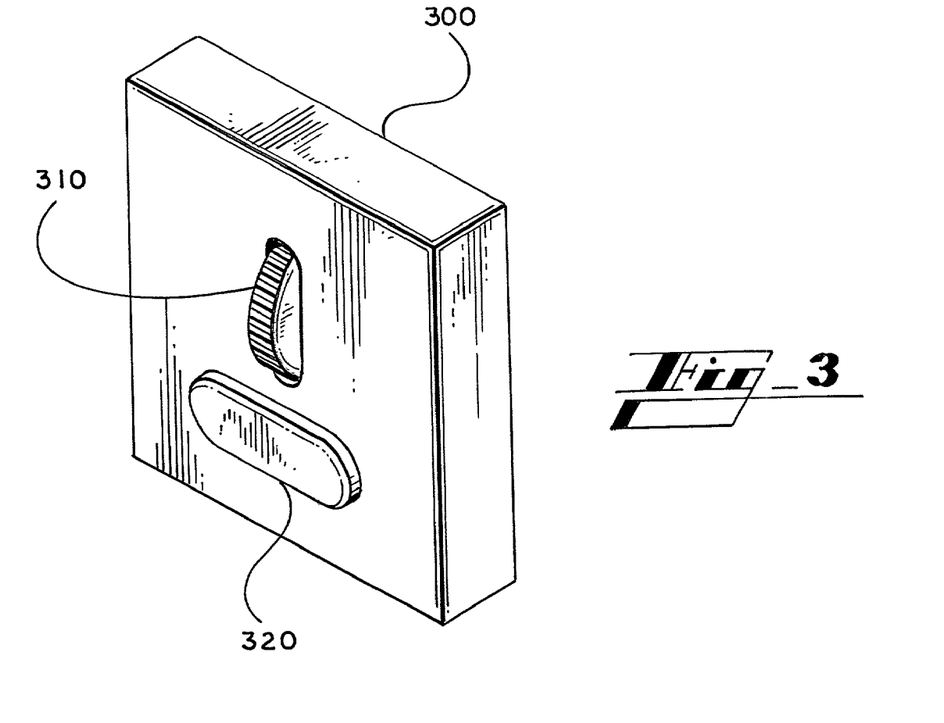
FIG. 3 is schematic of one embodiment of a satellite remote pad used in the present invention.
Figure 4:
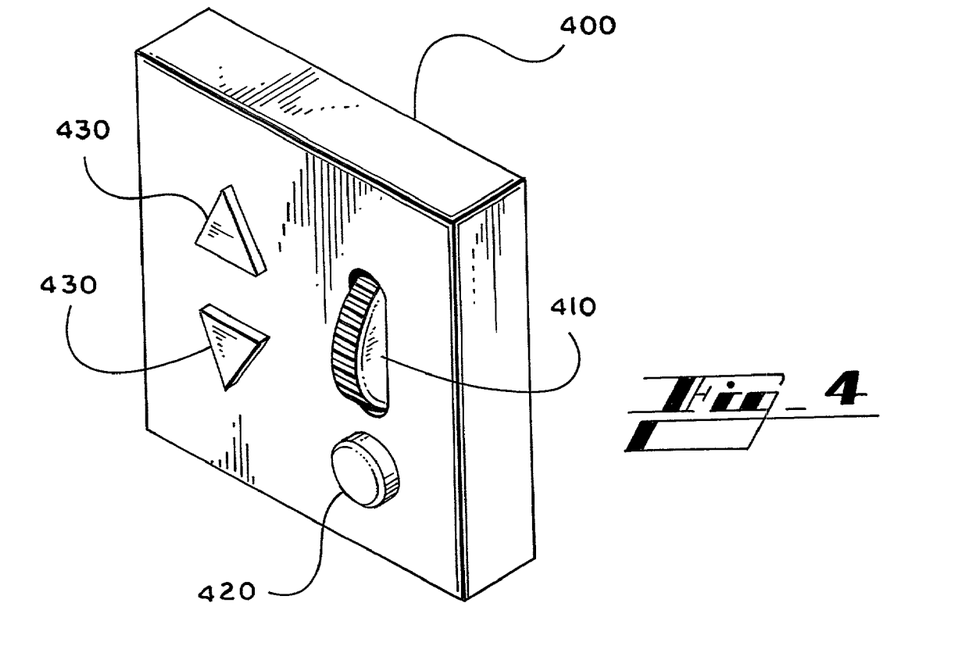
FIG. 4 is schematic of another embodiment of a satellite remote pad used in the present invention.

As shown in FIGS. 3 and 4, the satellite remote may comprise different features. As shown in the figures, the remote may be a pad, or may take another shape. In FIG. 3, the satellite remote pad 300 includes a scroll wheel 310 and a button 320 for placing the telephone call. The satellite remote pad 300 may also include a display (not shown) for displaying one or more name and/or telephone number entries from the telephone directory. While not replacing the audio announcement of the name, the display may be used when the vehicle is stopped to more quickly ensure that the desired party is selected and called. If more than one entry is shown, the desired entry may be highlighted or otherwise designated as the party to be called upon placement of the telephone call. The display may be a liquid crystal display (LCD) or other conventional display means.

FIGS. 3 and 4 show alternative embodiments of a satellite remote. The scroll wheel 310 in a remote pad 300 may be designed such that it may move in one direction or two directions. If the scroll wheel 310 only moves in one direction, then the user will be limited to searching for a name and/or number entry from the beginning of the directory to the end. However, in a preferred embodiment, the scroll wheel 310 is designed to permit movement in two directions, thereby permitting the user to search the telephone directory either from beginning to end or from end to beginning. Additionally, the scroll wheel 310 may be replaced by one or more buttons for searching through the telephone directory.

As shown in FIG. 4, the satellite remote pad 400 includes a scroll wheel 410, a button 420 for placing the telephone call, and buttons 430 for further enhancing the searching capabilities of the mobile telecommunications system. As previously described, the scroll wheel 410 may be rotated in one or, desirably, two directions to permit the user to scroll individually through the name and/or number entries from beginning to end and/or from end to beginning.

The buttons 430 may also be used to search through the names and/or numbers. However, the buttons 430 desirably move through the telephone directory in multiple entries of names and/or numbers at one time versus the scroll wheel 420, which desirably moves from one entry to the next. For example, the buttons 430 could be designed such that the telephone directory is moved by letter, either from the beginning of the alphabet to the end or from end the of the alphabet to the beginning. As such, pressing one button would cause the telephone directory to jump from the As to the Bs to the Cs or from the As to the Zs to the Ys and so on in succession. Or, the buttons could move numerically by phone number or by location in the telephone directory and, as discussed, could jump from beginning to end and/or from end to beginning.

Figure 5:
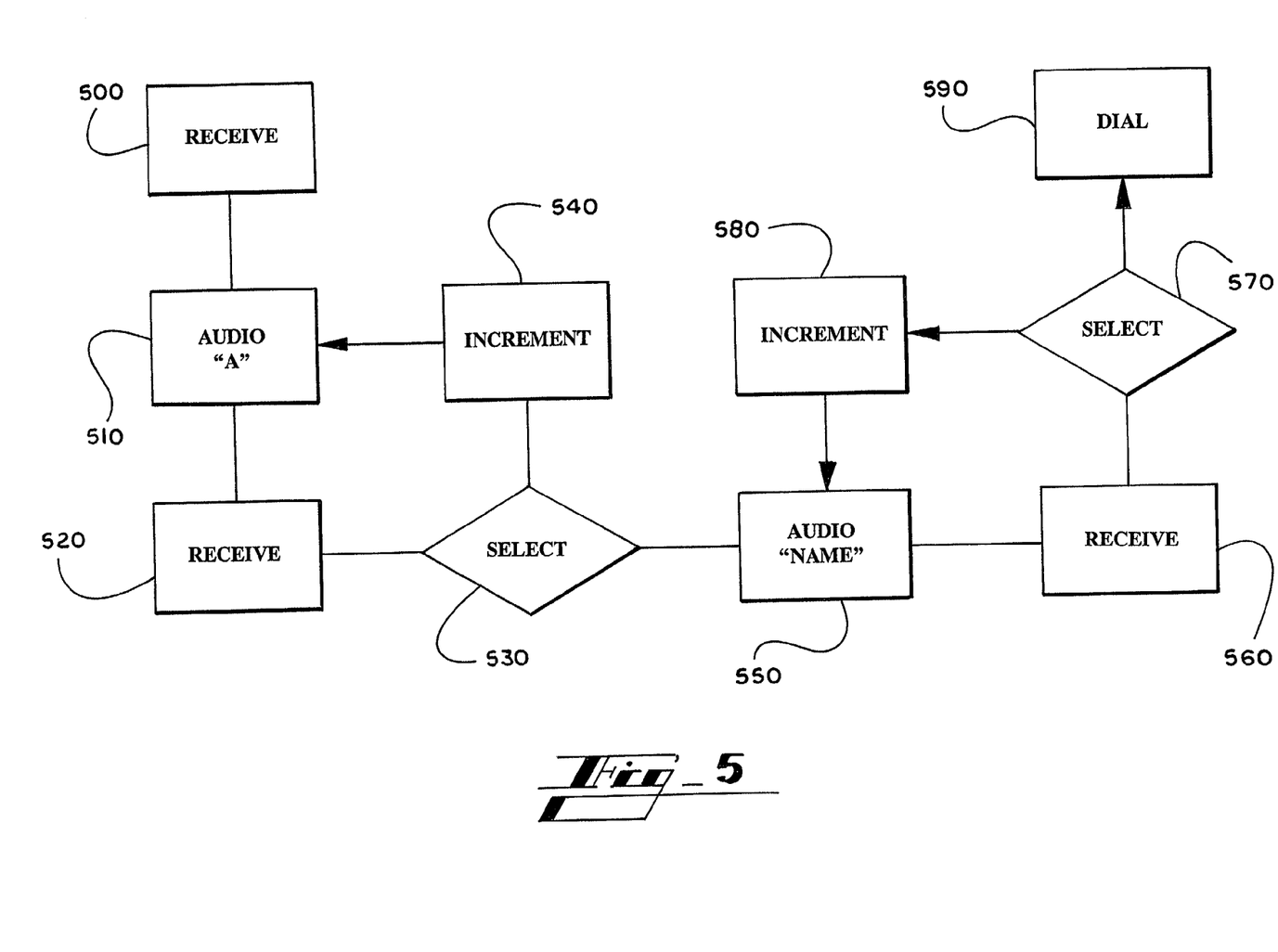
FIG. 5 is a flow chart for making a hands-free telephone call according to another embodiment of the present invention.

FIG. 5 provides a flow chart describing the use of an embodiment including the remote pad shown in FIG. 4. The user begins by using the buttons 430 for searching through the telephone directory in multiple entries of names and/or numbers at one time. In this embodiment, the names could be grouped alphabetically by last name. A signal is received by the system 500 from the satellite remote pad 400 regarding the letter of the alphabet. This signal is then sent to an audio generating software element 510 that sends an audio signal which is received by the means for producing an audio sound 520. This audio sound electronically announces the letter of the alphabet 530, such as "A", "B", "C" and so on. If this is not the desired portion of the telephone directory, the user can chose another name or number by using the buttons 430 for searching through the telephone directory in multiple entries to select another letter from the alphabet 540 which is then signaled to the audio generating software element 510.

Once the desired letter has been selected, the user may then locate an individual name using the logic provided in FIG. 2, also depicted herewith. The user scrolls individually through the entries of the names using the scroll wheel 410. A signal is then sent to an audio generating software element 550 that sends an audio signal which is received by the means for producing an audio sound 560. This audio sound electronically announces the name 570. If this is not the name and/or number of the desired party to be called, the user can chose another name by using the individual scroll means 410 to select another name 580 which is then signaled to the audio generating software element 550. Once the desired name and/or number has been selected, the user may then chose to have the person called 590 by pressing the means 420 for placing and disconnecting a telephone call.

As previously discussed, the mobile communications system of the present invention provides an audio component that announces the name and/or number of the party to be called as the user scrolls through the telephone directory. The name/number may be announced as each name/number appears, or a delay may be used to permit the user to scroll quickly to one section of the telephone directory and then begin searching for the desired name/number.

The names and/or numbers are announced using electronically-generated sound reproduction. Any conventional sound generation means may be used. Examples of possible sound generation means include, but are not limited to, FM, AM, Additive, Subtractive, wavetable, physical modeling and HyperSonic Sound System™. The audio may be heard by the driver by providing a speaker with the mobile telecommunications system, by using the mobile telephone's speakerphone, or by using the motor vehicle's speaker system or an earphone.

In addition to the satellite remote, the mobile telecommunications system of the present invention also includes a cradle, an original equipment manufacturer (OEM) or similar means for holding the mobile telephone. Depending on the type of mobile telephone used, the manner in which the satellite remote communicates with the mobile telephone, the location of the telephone directory, and/or the desired features of the mobile telecommunications system, the cradle may provide one or more features.

The cradle may simply hold the mobile telephone such that the satellite remote may easily communicate with the mobile telephone. Additionally, the cradle may connect to the mobile telephone such that the telephone directory of the telephone is accessed for searching through the names/numbers of the directory. Additionally, if the mobile telephone used is not capable of directly receiving signals from the satellite remote, the cradle may be designed to receive the signals and activate the desired feature or features of the mobile telephone.

The cradle is designed such that the satellite remote may send signals to the mobile telephone and/or cradle to search the telephone directory and/or place and disconnect telephone calls. As such, the mobile telecommunications system of the present invention includes means for the satellite remote to send signals to the cradle and/or mobile telephone. This may be accomplished a hard-wire connection, or through the use of wireless signals.

Desirably, the satellite remote communicates with the cradle and/or mobile telephone using wireless signals. Types of wireless signals useful in the present invention include, but are not limited to, infrared signals and radio frequency signals. By using a wireless signal, the present invention may be used in any existing motor vehicle as there would involve very little instillation. The satellite remote would simply be attached to the steering wheel and/or steering column and the cradle would be installed such that the satellite remote could communicate with the cradle and/or telephone.

If the cradle is hard-wired to the satellite remote, it is desirable to reduce the likelihood that the hard-wire is disturbed or damaged, thereby affecting communication between the satellite remote and the mobile telephone. As such, the wire may be installed in the motor vehicle, such as through the steering column. Accordingly, a hard-wire system may be better suited for newer motor vehicles as the hard-wiring may be installed upon manufacture. However, it is also contemplated that an existing motor vehicle could utilize a hard-wired system of the present invention as the use of wireless signals may not be as advantageous due to the environment in which the system is used, such as high levels of radio frequencies or difficulties in using an infrared signal.

As previously discussed, the mobile telecommunications system of the present invention may be used with any type of mobile telephone including, but not limited to, cellular, PCS, satellite telephones, walkie-talkies, dispatch radios and two-way radios.

Additionally, based upon the overall size and components of the system, the system of the present invention may be used in any type of motor vehicle, such as a car, truck or boat. The satellite remote may be small enough to be attached directly to the steering wheel and/or steering column using any known attachment means, such as adhesive backing, screws, nuts and bolts, hook-and-loop fasteners, and brackets, among others. Also, the cradle may sit freely in the motor vehicle or may be attached using any known attachment means to the motor vehicle as long as the satellite remote is still capable of communicating with the cradle/mobile telephone. Accordingly, depending on the communication means, the cradle may be placed anywhere in the motor vehicle that is desired.

The mobile telecommunications system of the present invention may include additional features to enhance the use of the system. The system may be designed to better fit in motor vehicles, such as the size of the components and/or color. Additionally, the system may be designed to lower the volume of the radio when an incoming call is received.

As can be seen, the present invention provides a hands-free vehicle mounted mobile telephone system with audio that enables a driver of a motor vehicle to dial and operate the phone without taking the driver's hands off of the steering wheel and without diverting the driver's vision from the road or waterway. The controls for the system are designed to be placed on or near the steering wheel/column of the motor-operated vehicle such that the driver may manipulate the controls using the driver's fingers. The device may be used with any type of mobile telephone.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

The embodiment set forth in FIG. 1 will now be described in greater detail to show how the present invention permits a user to use an existing mobile telephone while driver such that the user does not need to remove the user's eyes from the road and hands from the wheel to place a telephone call. Prior to beginning, the user places their phone in the cradle. The phone is now connected to the satellite remote pad either directly or through the cradle. The connection may be a hard wire or wireless. As such, depending on the type of connection used, the cradle may be located anywhere in the motor vehicle. Typically, however, the cradle will be located near the user such that when the user exits the vehicle, the user may quickly take the phone with them by removing from the cradle.

While driving, if a user desires to place a telephone call, the user activates the mobile telephone using the satellite remote pad located on the steering wheel. The user rotates the scroll wheel up or down to begin searching through the names. As the wheel is moved, the system sends a signal to the telephone directory and retrieves the first name listed in the directory. This signal is sent to the hardware portion of the system wherein software is used to convert the name signal into another signal that is received by an electronic voice generator. The generator announces the selected name such that the user is able to hear what name is currently selected. If that name is not the desired person to be called, the user then rotates the scroll wheel to the next name in the telephone directory and the process is repeated until the desired name is selected. The user then makes the call by depressing another button on the satellite remote to send a signal to the mobile telephone to place the call.

The telephone directory may be set up to provide the names alphabetically, numerically, or as entered into the directory. If alphabetically, the may be oriented by first name or, more desirably, last name. Numerical may be desired if the user has select numbers that are called, for example 911. Finally, as some mobile telephones store numbers as they are entered, the system may search through the entries as they were entered into the mobile telephone directory. For example, the first listing may be the user's home telephone number; the second listing may be the user's office telephone number; and so on. The software is designed to recognize the name or number listed and generate the requisite signals to have the electronic voice simulator announce the name as listed in the telephone directory.

As such, the present permits a user to use their hands while they are on the steering wheel to scroll through the entries in a telephone directory and place a call. Since the names are electronically announced by the system, the user also does not need to remove the user's eyes from the road while driving.

EXAMPLE 2

The embodiment set forth in FIG. 4 will now be described in greater detail to show how the present invention may also permit a user to more quickly use the system of Example 1.

In addition to the scroll wheel, this embodiment also includes buttons for jumping through the telephone directory more quickly. For example, if the person to be called had a last name beginning with the letter "J", it would be more beneficial to provide means for quickly bypassing through all of the entries beginning with letters "A" through "I". By using these buttons, a user may quickly search through the telephone directory to skip from all entries beginning with "A" to all entries beginning with "B" and so on. The system will announce each letter and, once the user has reached the desired first letter, the scroll wheel may be used to then advance though all of the entries having the same first letter.

The system may also be set up such that, when a new first letter is chosen, the user is taken to the first entry having the chosen letter. The user may then use the scroll wheel to reverse and go back, one-by-one, to the previous letter, thereby permitting a user to quickly select an individual who's name is near the end of a particular letter.

Alternatively, the entries may be grouped by area code or by another designation selected by the user, such as city or state. The buttons would then be used to jump to those entries having the same area code or that were entered as being in the same city or state. Lastly, if the telephone directory is separate from the mobile telephone, the user may group the numbers in any manner they desire, and the buttons may be programmed accordingly. As such, this embodiment provides a great deal of flexibility to a user in selecting the desired party to be called in the quickest most convenient manner.

We claim:

1. A method of making a hands-free mobile telephone call with a mobile telephone having an electronic directory, comprising:
   providing a base unit for removably receiving the mobile telephone unit;
   accessing the electronic telephone directory using a satellite remote unit separate from the base unit;
   searching the electronic telephone directory using the satellite remote unit separate from the base unit;
   sending a wireless signal from the satellite remote unit to the mobile telephone in the base unit to select an entry in the electronic telephone directory;
   generating an audible announcement of at least one of the number and name of the selected entry in the electronic telephone directory; and
   sending a wireless signal from the satellite remote unit to the mobile telephone in the base unit to make the mobile telephone call, wherein the satellite remote unit is used to access the electronic telephone directory, to search the electronic telephone directory, to select an entry in the electronic telephone directory, and to send the wireless signal to the mobile telephone to make the mobile telephone call.

2. The method of claim 1, wherein the satellite remote comprises a pad that is located such that a user may operate the satellite remote using the user's foot.

3. The method of claim 1, wherein searching the electronic directory comprises sending the wireless signal from a scrolling device on the satellite remote unit for searching through the electronic telephone directory and sending the wireless signal from the remote unit to select an entry in the electronic telephone directory of the mobile telephone.

4. The method of claim 1, wherein searching from the satellite remote unit comprises searching through the electronic telephone directory by name.

5. The method of claim 1, wherein searching from the satellite remote unit comprises searching through the electronic telephone directory by telephone number.

6. The method of claim 1, wherein searching from the satellite remote unit comprises searching through the electronic telephone directory by one entry at a time.

7. The method of claim 1, wherein searching from the satellite remote unit comprises searching through the electronic telephone directory by multiple entries at one time.

8. The method of claim 7, wherein the multiple entries are grouped by a letter of the alphabet and searching from the satellite remote unit comprises searching through the electronic telephone directory by the letters of the alphabet.

9. The method of claim 1, wherein searching from the satellite remote unit comprises searching through the electronic telephone directory by one entry at a time and by multiple entries at one time.

10. The method of claim 1, wherein searching the electronic telephone directory and sending the wireless signal to select an entry in the electronic telephone directory is accomplished using an infrared signal.

11. The method of claim 1, wherein searching the electronic telephone directory and sending the wireless signal to select an entry in the electronic telephone directory is accomplished using a radio frequency signal.

12. The method of claim 1, further comprising sending a signal from the satellite remote unit to the mobile telephone to answer an incoming mobile telephone call using the satellite remote unit.

13. The method of claim 1, further comprising sending a signal from the satellite remote unit to the mobile telephone to activate a call-waiting feature using the satellite remote unit.

14. The method of claim 1, wherein generating an audible announcement of the entry in the electronic telephone directory includes using a speaker or earphone to permit a user to hear the audible announcement.

15. The method of claim 1, wherein generating an audible announcement of the entry in the electronic telephone directory includes using a mobile telephone speakerphone or earphone to permit a user to hear the audible announcement.

16. The method of claim 1, wherein generating an audible announcement of the entry in the electronic telephone directory includes using a motor-vehicle speaker or earphone to permit a user to hear the audible announcement.

17. Mobile communication system for hands-free use with a mobile telephone having an electronic directory, comprising:
   a base unit for removably receiving the mobile telephone in a location of intended hands-free use;
   a satellite remote unit separate from the base unit and operative for a wireless signal communication with the mobile telephone received in the base unit;
   the satellite remote unit having at least one means operative to access the electronic directory of the mobile telephone received in the base unit with a search device so as to search through the electronic directory and select from that directory a party to be called;
   means for audibly announcing at least one of the name and number of the selected party to be called; and
   the satellite remote unit having means operative to signal the mobile telephone received in the base station to place a call to the selected party, so that a user can access the mobile telephone to select a party from the electronic directory, hear an audio announcement of the selected party, and place a call to the selected party, using the satellite remote unit and without physical contact with the mobile telephone.

18. The system of claim 17, wherein the scrolling device of the satellite remote unit is constructed and arranged to search through the electronic telephone directory by name.

19. The system of claim 17, wherein the scrolling device of the satellite remote unit is constructed and arranged to search through the electronic telephone directory by telephone number.

20. The system of claim 17, wherein the search device of the satellite remote unit is constructed and arranged to search through the electronic telephone directory by one entry at a time.

21. The system of claim 17, wherein the search device of the satellite remote unit is constructed and arranged to search through the electronic telephone directory by multiple entries at one time.

22. The system of claim 17, wherein the search device of the satellite remote unit comprises a scroll device operative to search through the telephone directory by one entry at a time and the satellite remote unit further includes means operative for searching through the telephone directory by multiple entries at one time.

23. The system of claim 17, wherein the means for audibly announcing a party to be called comprises a speaker or earphone.

24. The system of claim 17, wherein the means for audibly announcing a party to be called comprise a mobile telephone speakerphone or earphone.

25. The system of claim 17, wherein the means for audibly announcing a party to be called comprises a motor-vehicle speaker or earphone.

26. The system of claim 17, wherein the means for sending the wireless signal from the satellite remote unit to the mobile telephone comprises an infrared signal.

27. The system of claim 17, wherein the means for sending the wireless signal from the satellite remote unit to the mobile telephone comprises a radio frequency signal.

* * * * *